US008543623B2

(12) United States Patent
Gearhart et al.

(10) Patent No.: US 8,543,623 B2
(45) Date of Patent: Sep. 24, 2013

(54) SECURE DISTRIBUTION OF MEDIA DATA

(75) Inventors: Rob A. Gearhart, Austin, TX (US); Liam Harpur, Skerries (IE); Mark Kelly, Skerries (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 12/942,606

(22) Filed: Nov. 9, 2010

(65) Prior Publication Data

US 2012/0117130 A1    May 10, 2012

(51) Int. Cl.
G06F 17/00 (2006.01)
G06F 7/00 (2006.01)

(52) U.S. Cl.
USPC ........... 707/827; 707/641; 707/695; 707/913; 726/28

(58) Field of Classification Search
None
See application file for complete search history.

(56) References Cited

U.S. PATENT DOCUMENTS

| | | | | |
|---|---|---|---|---|
| 5,621,660 A * | 4/1997 | Chaddha et al. | ............... | 709/247 |
| 5,778,102 A * | 7/1998 | Sandford et al. | ............... | 382/251 |
| 5,889,868 A * | 3/1999 | Moskowitz et al. | ........... | 713/176 |
| 5,960,081 A * | 9/1999 | Vynne et al. | .................... | 713/176 |
| 6,061,793 A * | 5/2000 | Tewfik et al. | .................. | 713/176 |
| 6,233,347 B1 * | 5/2001 | Chen et al. | ..................... | 382/100 |
| 6,249,319 B1 | 6/2001 | Post | | |
| 6,266,817 B1 * | 7/2001 | Chaddha | ........................ | 725/146 |
| 6,275,599 B1 * | 8/2001 | Adler et al. | .................... | 382/100 |
| 6,285,774 B1 * | 9/2001 | Schumann et al. | ........... | 382/100 |
| 6,332,030 B1 * | 12/2001 | Manjunath et al. | ........... | 382/100 |
| 6,345,100 B1 * | 2/2002 | Levine | ........................... | 380/205 |
| 6,354,630 B1 * | 3/2002 | Zhang et al. | .................... | 283/70 |
| 6,363,209 B2 * | 3/2002 | Sako et al. | ..................... | 386/252 |
| 6,430,354 B1 * | 8/2002 | Watanabe | ...................... | 386/328 |
| 6,522,769 B1 * | 2/2003 | Rhoads et al. | ................ | 382/100 |
| 6,683,980 B1 * | 1/2004 | Meier et al. | .................... | 382/166 |
| 6,768,980 B1 * | 7/2004 | Meyer et al. | ................... | 704/500 |
| 7,251,832 B2 | 7/2007 | Venters, III et al. | | |
| 8,024,578 B2 | 9/2011 | Geosimonian | | |
| 8,392,826 B2 * | 3/2013 | Randall et al. | ................ | 715/249 |
| 2002/0076048 A1 * | 6/2002 | Hars | ............................. | 380/205 |
| 2002/0095582 A1 | 7/2002 | Peled et al. | | |

(Continued)

OTHER PUBLICATIONS

Office Action, dated Aug. 17, 2012, regarding USPTO U.S. Appl. No. 12/942,560, 13 pages.

(Continued)

Primary Examiner — Jung Kim
Assistant Examiner — James J Wilcox
(74) Attorney, Agent, or Firm — Yee & Associates, P.C.; Jeffrey S. LaBaw

(57) ABSTRACT

A technique for playing a media file by a data processing system. A degraded initial version of the media file is received from a sending data processing system. A supplemental version of the media file is received from the sending data processing system. The degraded version of the media file is merged with the supplemental version of the media file to form a combined media file, with the combined media file being played. In one embodiment, the degraded version of the media data has a reduced quality that is obtained by removing portions of the data and filling in the removed portions with dummy data. During a subsequent rebuilding of the media data by the receiving/recipient data processing system, a supplemental version of the media data is received and merged/combined with the degraded version to form a copy that corresponds to the original, high-quality version of the media data.

24 Claims, 12 Drawing Sheets

(56) References Cited

U.S. PATENT DOCUMENTS

| | | |
|---|---|---|
| 2004/0068536 A1* | 4/2004 | Demers et al. ............... 709/201 |
| 2004/0078575 A1 | 4/2004 | Morten et al. |
| 2004/0128702 A1* | 7/2004 | Kaneko ...................... 725/137 |
| 2006/0182278 A1 | 8/2006 | Lecomte et al. |
| 2006/0288423 A1 | 12/2006 | Le et al. |
| 2008/0057913 A1 | 3/2008 | Sinha et al. |
| 2008/0134342 A1 | 6/2008 | Shamoon et al. |
| 2008/0137848 A1 | 6/2008 | Kocher et al. |
| 2012/0117659 A1 | 5/2012 | Gearhart et al. |
| 2012/0198566 A1 | 8/2012 | Gearhart et al. |

OTHER PUBLICATIONS

Chen et al., "Adaptive and Lazy Segmentation Based Proxy Caching for Streaming Media Deliver", Jun. 2003, ACM, pp. 22-31.

USPTO Final Office Action, Mar. 26, 2013, regarding USPTO U.S. Appl. No. 12/942,560, 15 pages.

* cited by examiner

| BANDWIDTH (MHz) | SAMPLE BIT # |
|---|---|
| 28.96 | DUMMY PADDING |
| 40.08 | DUMMY PADDING |
| 66.28 | DUMMY PADDING |
| 200 | 2 |
| 300 | 3 |
| 400 | 4 |
| 500 | 5 |
| 600 | 6 |

Initial Degrated File:
abc***hijk*qrs***yz
Supplemental File:
*defglmnop*tuvwx**

| Sampling point (time) | Bandwidth info shared in a side-channel | Sender | Receiver | Comment |
|---|---|---|---|---|
| 1 | 88.21 KB | | play and transmit "a" at time1 | |
| 2 | 73.94 KB | sender recognizes "a" is correct | | |
| 3 | 81.19 KB | | play and transmit "b" at time3 | |
| 4 | 0.92 KB | sender recognizes "b" is correct | | |
| 5 | 29.06 KB | | play and transmit "c" at time5 | |
| 6 | 57.26 KB | sender recognizes "c" is correct | | At this stage the Sender knows that the Receiver stream is valid. |
| 7 | 40.08 KB | transmit "d" | | The Sender already knows that the Receiver does not have the next 4 letters (the master copy of the merged stream is at the senders side).... So the sender will send the Supplemental file so that it will reach the Receiver in time. |
| 8 | 55.24 KB | Sender transmits multiple "*" to fill the unused bandwidth. | | |
| 9 | 66.28 KB | transmit "e" | play "d" at time9 | "*" not played because the previous bandwidth value was 40.08 - which is a special bandwidth indicator/value that means the Receiver should ignore data |
| 10 | 35.62 KB | Sender transmits multiple "*" to fill the unused bandwidth. | | |
| 11 | 2.73 KB | transmit "f" | play "e" at time11 | "*" not played because the previous bandwidth value was 66.28 - which is a special bandwidth indicator/value that means the Receiver should ignore data |

FROM FIG. 13A

| | | | |
|---|---|---|---|
| 12 | 88.23 KB | Sender transmits multiple "¤" to fill the unused bandwidth. | "¤" not played because the previous bandwidth value was 28.96 - which is a special bandwidth indicator/value that means the Receiver should ignore data |
| 13 | 40.08 KB | transmit "f" | play "f" at time13 |
| 14 | 16.16 KB | Sender transmits multiple "¤" to fill the unused bandwidth. | "¤" not played because the previous bandwidth value was 40.08 - which is a special bandwidth indicator/value that means the Receiver should ignore data |
| 15 | 28.96 KB | | play "g" at time15 |
| 16 | 24.28 KB | Sender transmits multiple "¤" to fill the unused bandwidth. | "¤" not played because the previous bandwidth value was 28.96 - which is a special bandwidth indicator/value that means the Receiver should ignore data |
| 17 | 66.28 KB | | play "h" at time17 |
| 18 | 81.40 KB | Sender transmits multiple "¤" to fill the unused bandwidth. | "¤" not played because the previous bandwidth value was 28.96 - which is a special bandwidth indicator/value that means the Receiver should ignore data |
| 19 | 40.08 KB | | play "i" at time19 |
| 20 | 16.16 KB | Sender transmits multiple "¤" to fill the unused bandwidth. | "¤" not played because the previous bandwidth value was 40.08 – which is a special bandwidth indicator/value that means the Receiver should ignore data |
| 21 | 28.96 KB | | play "j" at time21 |
| 22 | 24.28 KB | Sender transmits multiple "¤" to fill the unused bandwidth. | "¤" not played because the previous bandwidth value was 28.96 - which is a special bandwidth indicator/value that means the Receiver should ignore data |
| 23 | 40.08 KB | transmit "j" | play "k" at time23 |
| 24 | 55.24 KB | Sender transmits multiple "¤" to fill the unused bandwidth. | "¤" not played because the previous bandwidth value was 40.08 - which is a special bandwidth indicator/value that means the Receiver should ignore data |
| 25 | 66.28 KB | transmit "m" | play "l" at time25 |

FROM FIG. 13B

| | | | |
|---|---|---|---|
| 26 | 35.62 KB | Sender transmits multiple "*" to fill the unused bandwidth. | "*" not played because the previous bandwidth value was 66.28 - which is a special bandwidth indicator/value that means the Receiver should ignore data |
| 27 | 28.96 KB | transmit "n" | play "m" at time27 |
| 28 | 88.23 KB | Sender transmits multiple "*" to fill the unused bandwidth. | "*" not played because the previous bandwidth value was 28.96 - which is a special bandwidth indicator/value that means the Receiver should ignore data |
| 29 | 40.08 KB | transmit "o" | play "n" at time29 |
| 30 | 16.16 KB | Sender transmits multiple "*" to fill the unused bandwidth. | "*" not played because the previous bandwidth value was 40.08 - which is a special bandwidth indicator/value that means the Receiver should ignore data |
| 31 | 40.08 KB | transmit "p" | play "o" at time31 |
| 32 | 16.16 KB | Sender transmits multiple "*" to fill the unused bandwidth. | "*" not played because the previous bandwidth value was 40.08 - which is a special bandwidth indicator/value that means the Receiver should ignore data |
| 33 | 28.96 KB | | play "p" at time33 |
| 34 | 24.28 KB | Sender transmits multiple "*" to fill the unused bandwidth. | "*" not played because the previous bandwidth value was 28.96 - which is a special bandwidth indicator/value that means the Receiver should ignore data |
| 35 | 66.28 KB | | play "q" at time35 |
| 36 | 81.40 KB | Sender transmits multiple "*" to fill the unused bandwidth. | "*" not played because the previous bandwidth value was 66.28 - which is a special bandwidth indicator/value that means the Receiver should ignore data |
| 37 | 40.08 KB | | play "r" at time37 |
| 38 | 16.16 KB | Sender transmits multiple "*" to fill the unused bandwidth. | "*" not played because the previous bandwidth value was 40.08 - which is a special bandwidth indicator/value that means the Receiver should ignore data |
| 39 | 40.08 KB | transmit "t" | play "s" at time39 |

FROM FIG. 13C

| # | Size | Sender action | Play action | Note |
|---|---|---|---|---|
| 40 | 55.24 KB | Sender transmits multiple "*" to fill the unused bandwidth. | | "*" not played because the previous bandwidth value was 40.08 - which is a special bandwidth indicator/value that means the Receiver should ignore data |
| 41 | 66.28 KB | transmit "u" | play "t" at time41 | |
| 42 | 35.62 KB | Sender transmits multiple "*" to fill the unused bandwidth. | | "*" not played because the previous bandwidth value was 66.28 - which is a special bandwidth indicator/value that means the Receiver should ignore data |
| 43 | 28.96 KB | transmit "v" | play "u" at time43 | |
| 44 | 88.23 KB | Sender transmits multiple "*" to fill the unused bandwidth. | | "*" not played because the previous bandwidth value was 28.96 - which is a special bandwidth indicator/value that means the Receiver should ignore data |
| 45 | 40.08 KB | transmit "w" | play "v" at time45 | |
| 46 | 16.16 KB | Sender transmits multiple "*" to fill the unused bandwidth. | | "*" not played because the previous bandwidth value was 40.08 - which is a special bandwidth indicator/value that means the Receiver should ignore data |
| 47 | 40.08 KB | transmit "x" | play "w" at time47 | |
| 48 | 16.16 KB | Sender transmits multiple "*" to fill the unused bandwidth. | | "*" not played because the previous bandwidth value was 40.08 - which is a special bandwidth indicator/value that means the Receiver should ignore data |
| 49 | 28.96 KB | | play "x" at time49 | |
| 50 | 24.28 KB | Sender transmits multiple "*" to fill the unused bandwidth. | | "*" not played because the previous bandwidth value was 28.96 - which is a special bandwidth indicator/value that means the Receiver should ignore data |
| 51 | 66.28 KB | | play "y" at time51 | |
| 52 | 81.40 KB | Sender transmits multiple "*" to fill the unused bandwidth. | | "*" not played because the previous bandwidth value was 66.28 - which is a special bandwidth indicator/value that means the Receiver should ignore data |
| 53 | 40.08 KB | | play "z" at time53 | |

*FIG. 13D*

SECURE DISTRIBUTION OF MEDIA DATA

BACKGROUND

1. Field

The disclosure relates generally to techniques for secure distribution of media content/data, and more specifically to techniques for distributing media content/data in a two-phased fashion, where an initial distribution of a degraded form of the media data is followed by a supplemental distribution of supplemental media data after identifying or authenticating one or more recipients of the media content/data.

2. Description of the Related Art

Multimedia can be defined as a combination of different types of media (e.g., text, images, audio, video, and graphics) to communicate information in a given application. Recent advances in digital technologies have drastically increased the capacity of both data channels and storage. With the higher capacity of storage devices and data communication channels, media content/data has become ubiquitous, with this type of data now commonly being used in many areas such as entertainment, journalism, education, law enforcement, national defense, and the health care industry. The transition from analog to digital data as the preferred method for maintaining and distributing media data has made it easy to replicate media data without data loss. The lowered cost of reproduction, storage, and distribution has added an additional dimension to the complexity of the problem.

In a number of applications, media data needs to be protected from replication in order to control or prevent unwanted or illegal copying of such media data. Cryptography and watermarking are just a few of numerous known digital rights management techniques that are used to control or prevent unwanted or illegal copying of media data. However, each such technique has associated drawbacks that lead to undesirable affects. For example, use of cryptography has significant management overhead in creating and managing keys used to encrypt and decrypt data. In addition, such cryptography protection can be easily thwarted if a key is lost or stolen.

Use of watermarking, where a symbol or image is overlain over the media data to adversely affect its quality, does not easily allow for an end user to upgrade to a higher quality version of the degraded version if they desire to upgrade in a try-and-buy scenario where a potential purchaser/user of the content desires an initial preview of the data before making their purchase/acquisition decision.

What is needed is a technique for secure distribution of media data that mitigates/eliminates piracy of such media data.

SUMMARY

According to one embodiment of the present invention, a method is provided for playing a media file by a data processing system. A degraded initial version of the media file is received from a sending data processing system. A supplemental version of the media file is received from the sending data processing system. The degraded version of the media file is merged with the supplemental version of the media file to form a combined media file, with the combined media file being played.

In one embodiment, the initial, degraded version of the media data has a reduced quality that is obtained by removing portions of the data and filling in the removed portions with dummy data. A supplemental version of the media data that is subsequently sent to the recipient data processing system by a sending data processing system is merged or combined with the initial, degraded version to form a copy that corresponds to the original, high-quality version of the media data.

In one embodiment, the initial, degraded version of the media data is received by participants of a teleconference, where a receiver of the media data then receives the subsequent version of the media data for the participants of the teleconference.

BRIEF DESCRIPTION OF THE SEVERAL VIEWS OF THE DRAWINGS

FIG. 13 (including FIGS. 13A-D) depicts a representative example of a media download operation.

DETAILED DESCRIPTION

Figure 1:
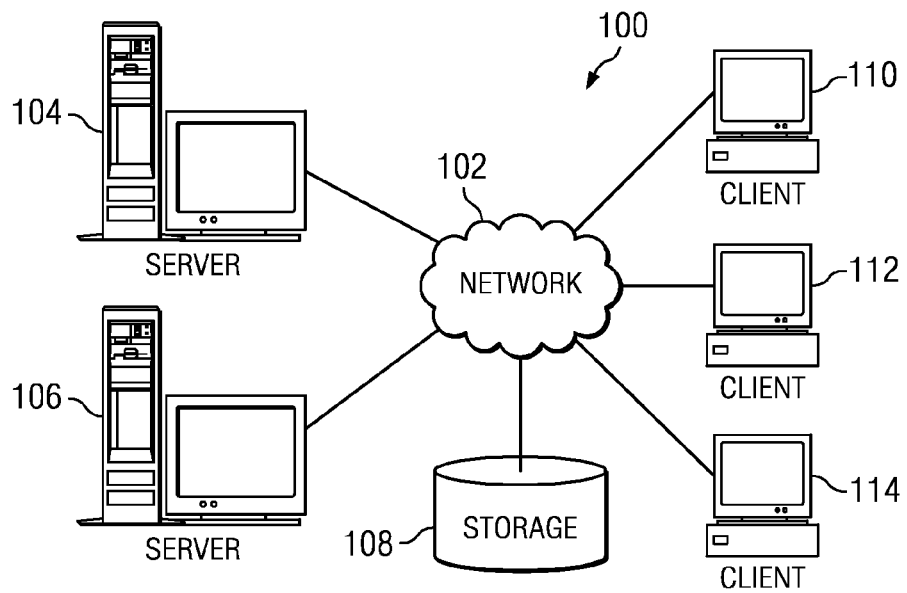
FIG. 1 depicts a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to one embodiment of the present invention, a method is provided for distributing media data, where an initial, degraded version of the media data is sent to one or more recipients. After confirming identity or authenticating a recipient(s), a subsequent version of the media data is sent to the recipient that augments the initial, degraded version, where it can then be played at full quality.

In one embodiment, the initial, degraded version of the media data has a reduced quality that is obtained by removing portions of the data and filling in the removed portions with dummy data that is designated with one or more markers. These markers are used during a subsequent rebuilding of the media data, where the subsequent version of the media data that is sent to the recipient is merged or combined with the initial, degraded version to form a copy that corresponds to the original, high-quality version of the media data. Alternatively, the reduced quality of the initial, degraded version of the media data is achieved by sending a version of the media data that has a reduced sampling rate such as a 56 kilobit-per-second (kps) sampling rate.

In one embodiment, the initial, degraded version of the media data is sent to participants of a teleconference, where a sender of the media data then sends the subsequent version of the media data to the participants of the teleconference after confirming who is in attendance of the teleconference.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
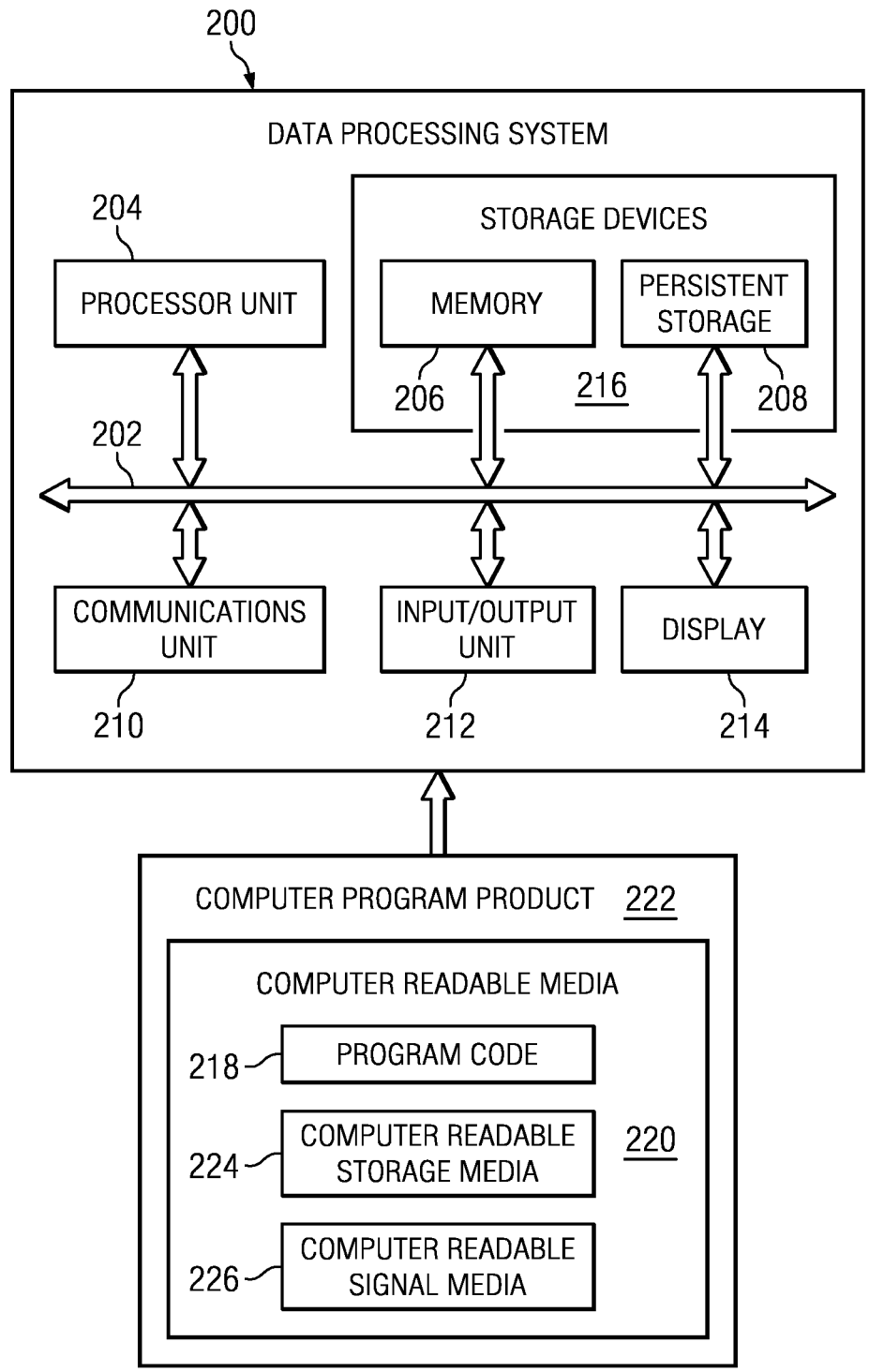
FIG. 2 depicts a pictorial representation of a data processing system in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
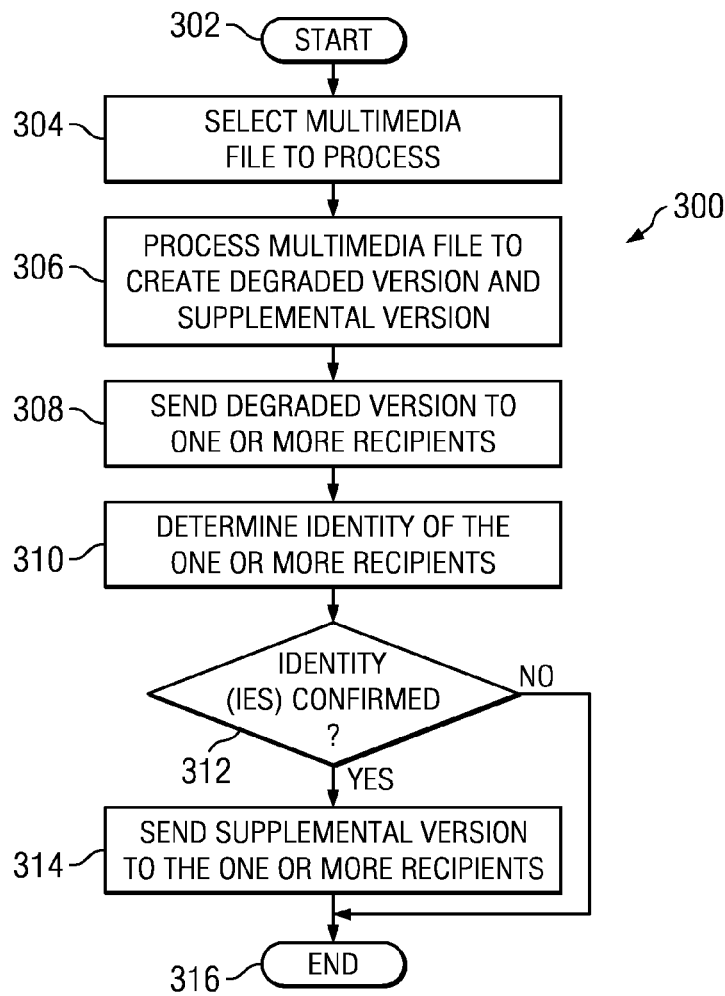
FIG. 3 is a logical flow diagram for processing performed at a sending/originating data processing system.

Turning now to FIG. 3, a process performed by a sending data processing system is depicted at 300, whereby media content/data is desired to be sent to one or more recipients. The process begins at step 302, and proceeds to step 304 where a media file to be processed is selected. This selected media file is then processed to create an initial, degraded version of such media file, as well as, optionally create a supplemental version of such media file at step 306. The degraded version is then sent to one or more recipients at step 308. In a preferred embodiment, the recipients are participating in a teleconference meeting with the sender of the media information as further described below with respect to FIG. 7. An identity determination is made at step 310 with respect to the recipient(s)/meeting attendees for which the degraded version has been sent. If the recipient(s)/meeting attendees' identity is confirmed at step 312, the supplemental version of the media file is then sent to the recipient(s)/meeting attendees at step 314, with the process then terminating at step 316. However, if the identities/authentications are not properly made, the system terminates at step 316 without sending the supplemental version, thereby ensuring that the supplemental version is only sent to properly identified/authenticated recipients.

Figure 4:
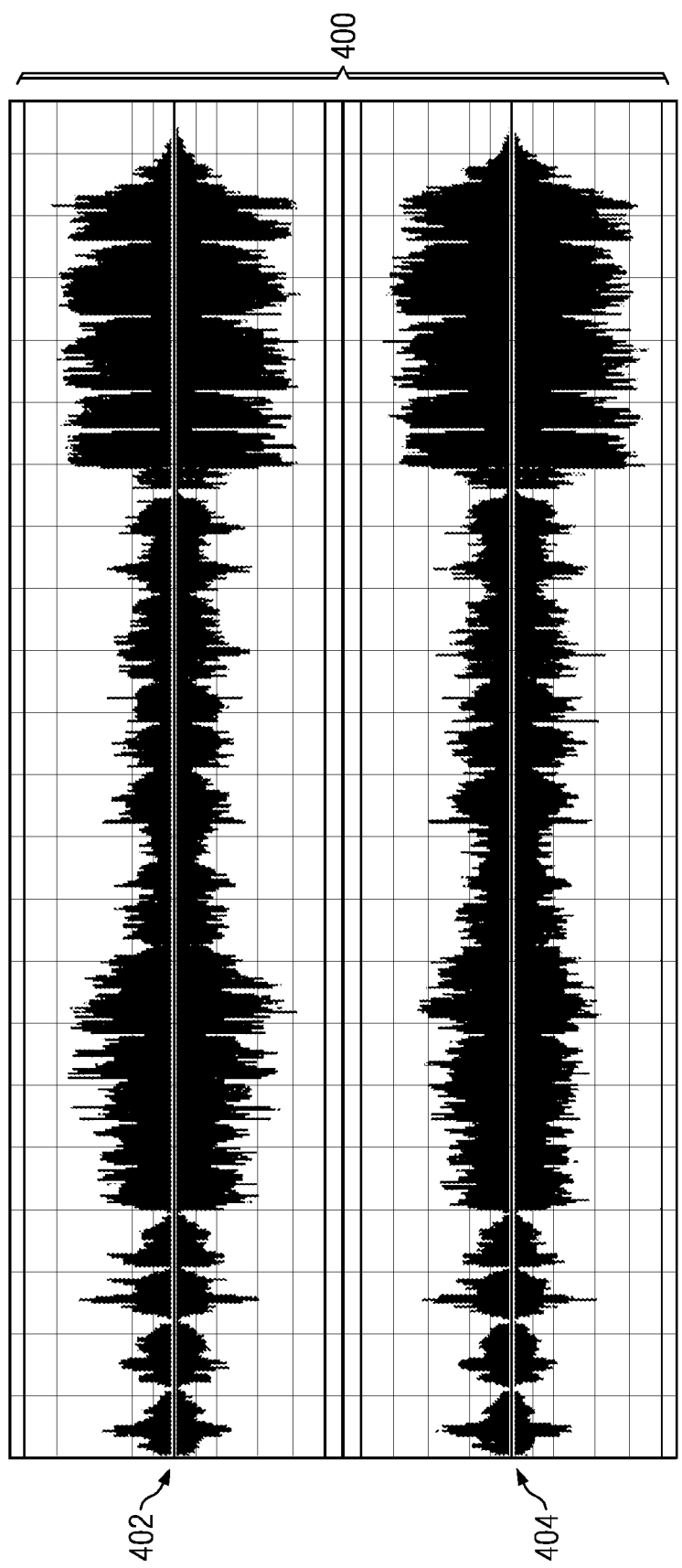
FIG. 4 depicts an example original, full quality media data file, where this particular media data file is a Waveform Audio File Format (WAV) file.

Turning now to FIG. 4, there is depicted an example media data file 400. This particular media data file is a Waveform Audio File Format (WAV) file, which is a standard format for storing audio bit streams. Two stereo channels are shown at 402 and 404. This is an example of a complete (non-degraded) media file that a user may desire to distribute to others. However, the user does not want to initially send the complete media file due to security/piracy concerns. Thus, per the features provided herein, an initial, degraded version of this WAV file is initially sent to one or more recipients.

Figure 5:
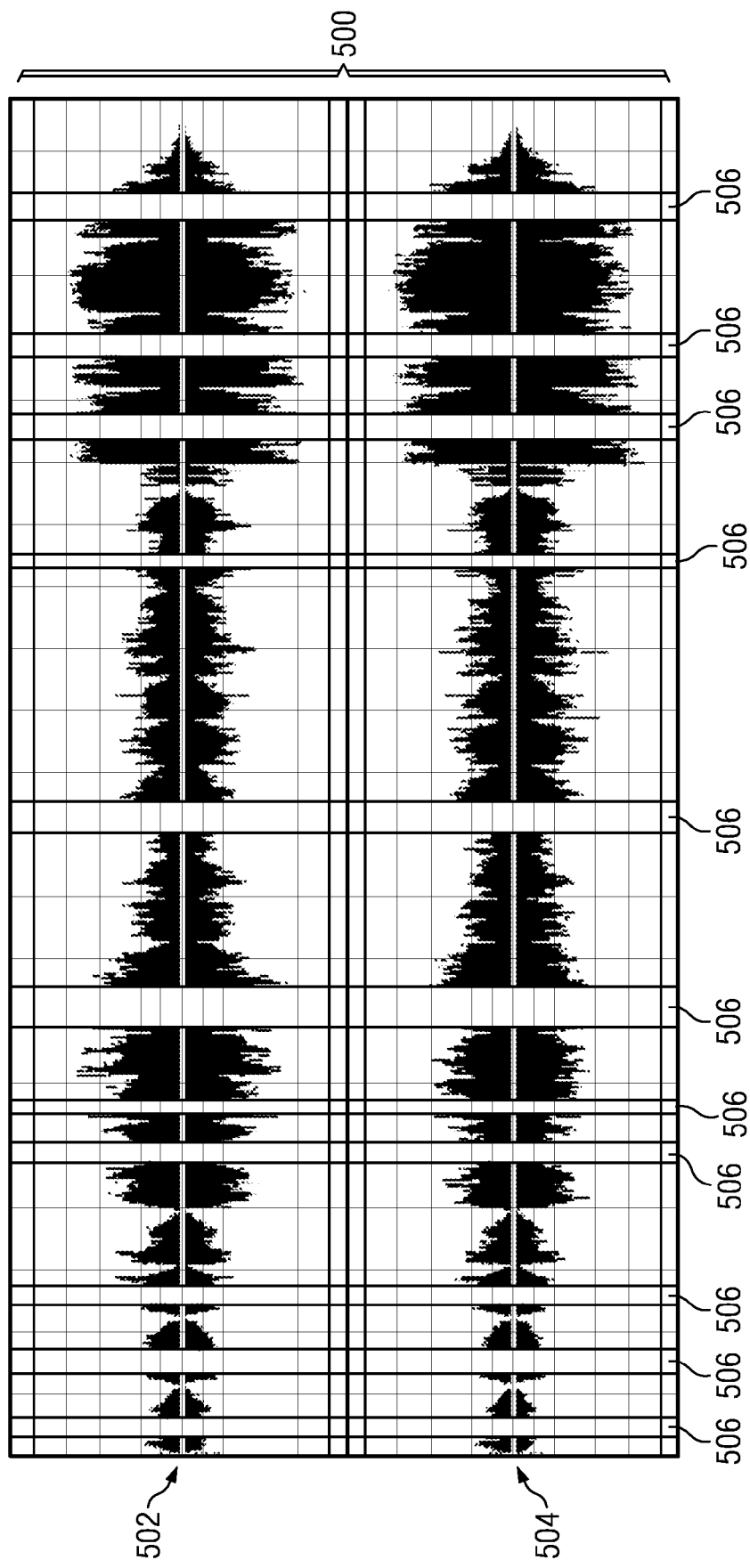
FIG. 5 depicts an example initial, degraded quality media data file.

An example of such initial, degraded version of a WAV file is shown at 500 of FIG. 5. This degraded WAV file 500 also has two stereo channels as shown at 502 and 504. However, as shown at elements 506, a plurality of gaps exist in this degraded WAV file 500 in order to reduce the quality, and thus the value, of this degraded media data file since if a user were to attempt to play this degraded media file it would not sound like the original, non-degraded media data file 400 of FIG. 4. Instead of only deleting these portions of data where the gaps 506 are depicted, dummy data is inserted into such gaps 506 in order to maintain the overall structure of the media file in the time domain, such that the playing time for such degraded media file remains the same as original media data file 400. This dummy data not only provides the requisite degrading of the file since it is not the original data of the media data file, but such dummy data acts as a set of markers that are detectable on the receiving side when recombining this degraded media file with a subsequently sent supplemental data file containing the data/information that was removed from the media file when creating the initial, degraded version.

The 'gap' data that is to be replaced with dummy data is configurable to be created using one or more of the following criteria:
  a. On a random basis, the start of the gap is chosen and the gap length is chosen randomly;
  b. On a random basis, the start of the gap is chosen but the length of the gaps is configured (e.g. if the sender believes the network bandwidth will be good, then the average gap size may be changed accordingly to increase the length of the gaps since the subsequently sent supplemental file can contain more 'good' data due to the higher, available bandwidth);
  c. The system may be configured to set constraints on the maximum and minimum number of gaps and the maximum and minimum length of gaps.

The dummy data is inserted into the gaps using random data generated by the system, or data is chosen that when overlaid with the remote data stream (a.k.a. supplemental version), the user will not hear it. For example, the remote data stream signal may "out-shout" the dummy data or cancel it out. The dataset with dummy data (a.k.a the initial, degraded version) is sent to the remote participants prior to the meeting. This dataset can optionally be encrypted prior to being sent. The original data that existed in the original/master media file at these gap locations is maintained at the sender data processing system as the supplemental data that is subsequently sent (after confirming/authenticating recipients/meeting participants at the remote location).

The remote participants are provided with, or have access to, a remote software program. The sender also has a local software program, and both programs (the local software program and the remote software program) interact with each other in order to ascertain on an ongoing basis the upload and download speed of the network. The remote software program in essence orchestrates the overall processing that occurs at the remote site in that it provides the initial, degraded data set (with inserted dummy data) to a mixing program that mixes or combines this initial, degraded data set with another supplemental stream that is provided by the sender in real time during the meeting. This mixing program, which can be an integrated routine within the remote software program or a stand-alone application, syncs/combines the two files (the initial, degraded file and the supplemental file) together on the fly.

The local software program on the sender side detects that a valid component stream exists on the recipient side (and vice versa) and, when invoked by a sender after authenticating/confirming the recipient side meeting attendees, provides the supplemental file to the remote software program. The "on-the-fly" supplemental content provided by the sender consists of a waveform which is incomprehensible on its own, since it is in essence the portion deleted from the original media file that was used to create the initial, degraded file.

The local and remote software programs work together to dynamically determine the existing available network bandwidth between the sender and receiver sites, using traditional techniques known in the art. As will be further described below, the current detected bandwidth is used to reference/index a mapping table that specifies characteristics associated with the file(s) being transmitted. The sender side knows what is missing at the recipient side (as the sender software program created both files that are sent to the recipient side), so the sender software program looks at the constantly changing network bandwidth and pads the supplemental file (to be sent to the recipient side) with random data to maintain the overall structure and time domain of the waveform to be sent as the supplemental file to the recipient side. In essence, the supplemental file is padded with random/dummy data at the locations where 'good' data was sent in the initial, degraded version similar to how the initial, degraded version was padded with dummy data to degrade the quality of the waveform for such initial, degraded file. As there is a shared understanding of the network bandwidth, the remote software program knows to take certain sections of the "senders" data that contain the data missing from the initial, degraded file. For example, if there is currently a 300 KB bandwidth (at a particular moment in time), the recipient will know to take every 3rd byte of the incoming supplemental file, as the sender site will have padded the supplemental file it is sending to the receiver site in a corresponding fashion. If both sides determine that there is 600 KB bandwidth (at a particular moment in time) the remote software program will know to take every 6th byte of the supplemental file.

In essence, the bandwidth is used by the sender side to determine how to organize—and in particular where to place—the good data (that is missing from the initial, degraded file) with respect to the padded/dummy data in the supplemental file, and is used by the receiver side to determine what portions of the received supplemental data to be extracted and combined with the initial, degraded file. Video/video media content works in the same way.

After having selected a media file/content to process, and having processed the selected media file to create both a degraded version and a supplemental version of such file/content, as described above, the degraded media file (such as WAV file 500 of FIG. 5) is then sent to one or more intended recipients at step 306 of FIG. 3. Such sending may occur during a particular phase or aspect of a teleconference meeting where the sender and one or more intended recipients are remotely connected together via a communication network that may include both video and audio interconnection to facilitate a meeting where participants are not all in the same room or location. Such generalized teleconference capabilities are commonly known in the art. Per the present features described herein, such teleconference capabilities are augmented with a control process that allows a sender of media content to initiate the sending of the supplemental version of the media content to the one or more recipients of the initial, degraded version of the media content upon successfully determining/confirming the identities of such recipients. For example, the sender may visually confirm the identities of such recipients using the video and/or audio signals it receives from the recipients teleconference equipment, such as a camera. Alternatively, the recipients may be required to be authenticated using known authentication techniques such as passwords, cryptographic keys used to decrypt encrypted data, smart cards, biometric sensors, or the like.

Once having confirmed the identities of the recipients at steps 310 and 312 of FIG. 3, the sender of the media content may invoke a play button on, for example, a console of the teleconference equipment or on a computer attached to or a part of such teleconference equipment. In response to selecting the play button, the supplemental version of the media content is sent to the one or more recipients in a supplemental file at step 314 of FIG. 3, where it may then be synchronized with the initial, degraded version of the media content in order to form a copy at the recipient-side that is a substantial or complete copy of the original media content that was selected for processing per step 304 of FIG. 3.

Figure 6:
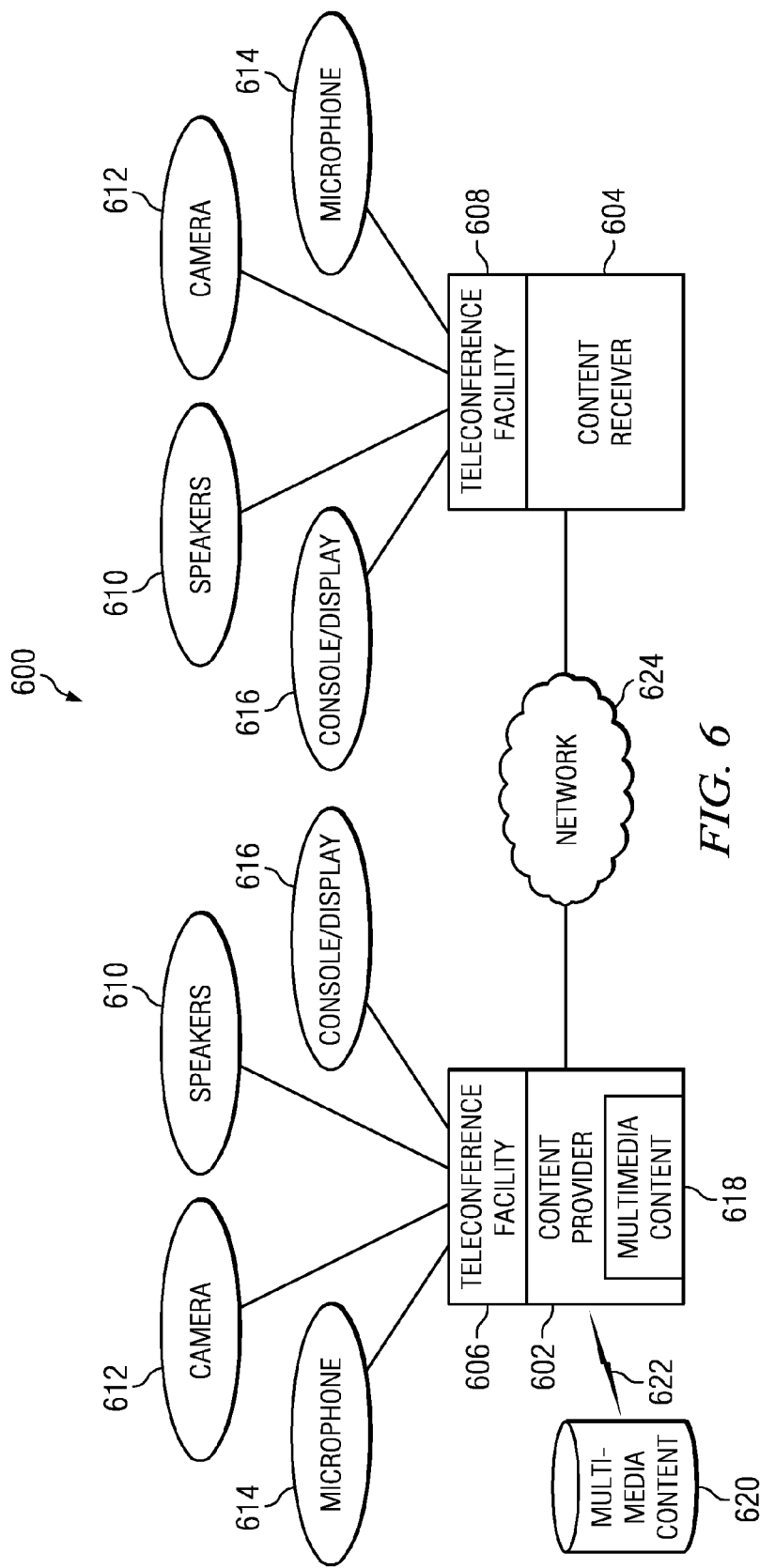
FIG. 6 depicts a representation of an overall data synchronization system.

Turning now to FIG. 6, such a data synchronization system is depicted at 600. A content provider, such as a sending data processing system 602 is coupled to receiving data processing system 604 through data network 624. In a preferred embodiment, each of the sending data processing system 602 and the receiving data processing system 604 include an embedded teleconference facility 606 and 608, respectively, that facilitates the establishment and management of a teleconference session between at least one sender at the sending data processing system 602 and at least one receiver at the receiving data processing system 604. In an alternative embodiment, one or both of the teleconference facilities is not embedded within a respective data processing system, but instead is a stand-alone system that is operably coupled to such respective data processing system.

Each of the respective teleconference facilities 606 and 608 have coupled thereto one or more speakers 610, one or more cameras 612, one or more microphones 614 and one or more console/displays 616 to facilitate the input and output of video and/or audio data during a teleconference session. The sending data processing system 602 also has access to media content which is maintained either locally at 618 or accessed remotely at 620 via network connection 622.

Figure 7:
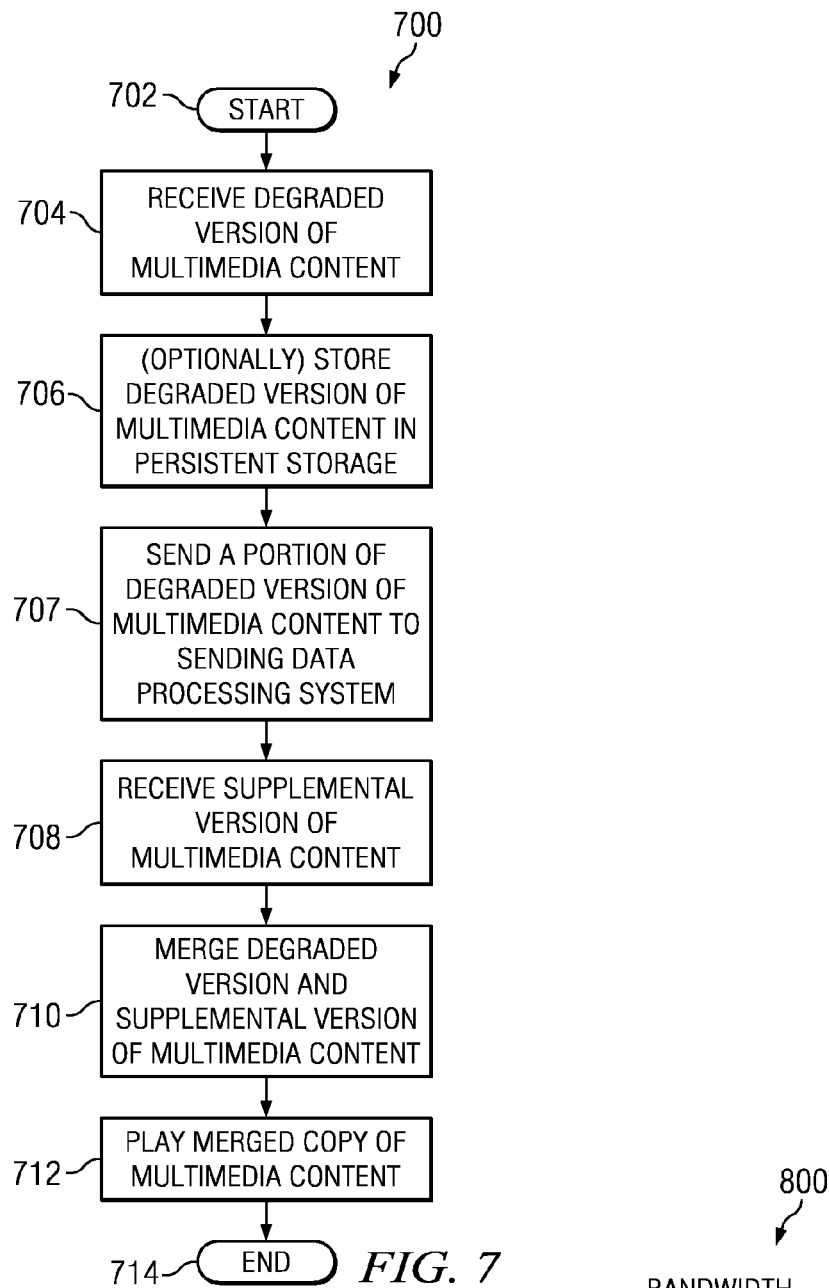
FIG. 7 depicts processing that occurs by a receiving/recipient data processing system.

FIG. 7 depicts processing that occurs by a receiving/recipient data processing system 700, such as receiving data processing system 604 of FIG. 6. The process starts at step 702, and proceeds to step 704 where a degraded version of media content is received. This degraded version can be optionally stored in persistent memory at step 706 since it is of degraded quality with an associated reduced value due to such degradation. A portion of this degraded version is also sent back, or echoed back, to the sending data processing system at step 707 such that the sending data processing system 602 can confirm successful receipt of such portion of the degraded version at the receiving data processing system 604. A supplemental version of the media content is received from the sending system at step 708, as a result of the sending system having confirmed/authenticated the one or more recipients at the receiving system, as previously described. The initial degraded version of the media content and the supplemental version of the media content are merged at step 710, and such merged copy of the media content can then be played at step 712, including video and/or audio content, with the process ending at step 714. Due to security restrictions and piracy concerns, this merged copy is prevented from being stored in a persistent storage device by the control process that performs the merging step, since if such storage were allowed, virtually identical copies of this merged copy of the media content could be made and/or distributed to undesired third-parties. In addition, due to the unique structures of these two data files, and their subsequent mixing/merging by this special control process using a dynamically shared variable between the sender and receiver (the shared variable being an established bandwidth between the sender and receiver, in the preferred embodiment), the files would be unintelligible to any other type of software program that might attempt to merge these files together.

In one embodiment, both the sender side and receiver side ascertain network bandwidth between each site and communicate this with each other. If there is a discrepancy, the 'worst' case or lesser bandwidth is used. Based on the agreed upon bandwidth, the sender generates padding data based on such established bandwidth. The good data required by the recipient side, which is known by the sender since the sender has a copy of both the original file and the marked degraded file that was previously sent to the receiving/recipient data processing system, is padded with dummy/random data to maintain the overall waveform structure and time domain.

For example, if the original media file was degraded to a sixty (60) percent quality level, where gaps were initially formed and padded with dummy data (as previously described), the supplemental/good data that needs to now be sent to the sending/recipient side is the remaining forty (40) percent of the original media file. This supplemental/good data, which is extracted from the original media file by the sending data processing system, is also padded in similar fashion to the initial/degraded file in order to maintain the overall file structure in the time domain.

Figure 8:
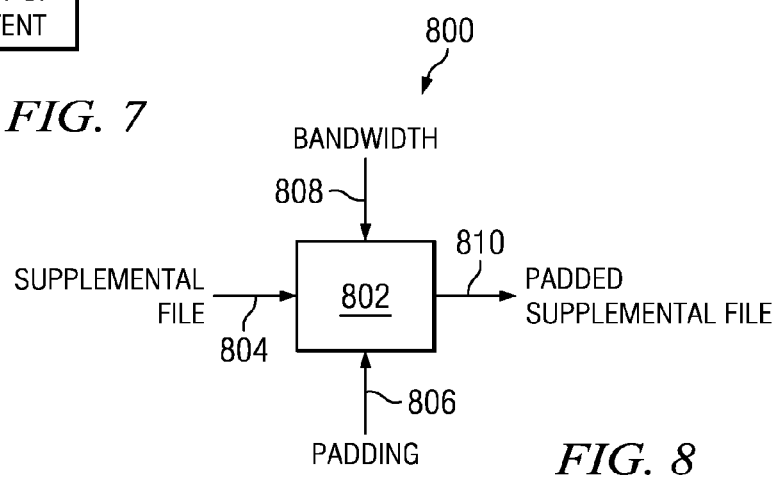
FIG. 8 depicts a sub-system for padding supplemental data file that is to be sent by the sending system to the receiving system.

Turning now to FIG. 8, there is shown at 800 a sub-system for padding the supplemental data file that is to be sent by the sending system to the receiving system. Mixer/combiner control logic 802 determines how to pad the supplemental data file 804 with padding/dummy data 806 based upon the previously agreed upon parameter, which in the preferred embodiment is the bandwidth 808, in order to produce padded supplemental file 810. This parameter is used as an index into a mapping table to determine how to pad the supplemental data file by specifying physical locations in such supplemental data file for where to place the padding/dummy data.

Figures 9, 10:
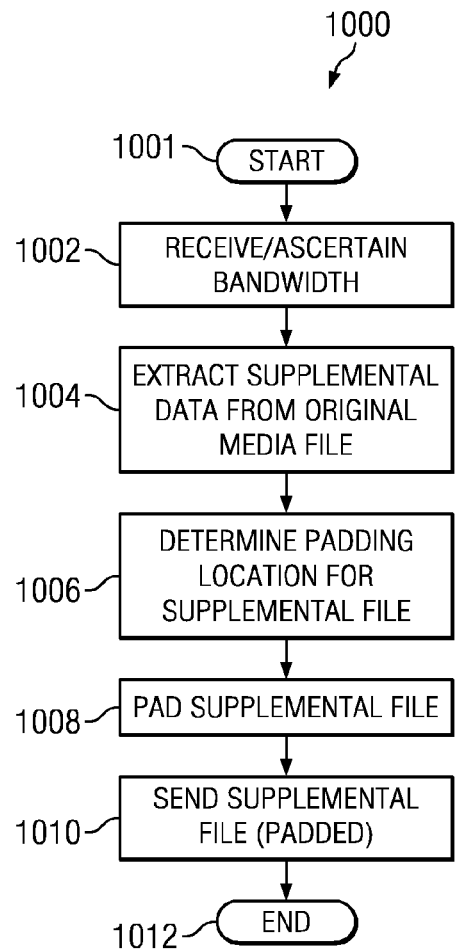
FIG. 9 depicts a representative mapping table used to pad supplemental data by a sending system and mix two data streams by a receiving system.
FIG. 10 depicts a supplemental data file padding process performed by a sending system.

A representative mapping table is shown by 900 in FIG. 9, where a given agreed upon parameter such as bandwidth is used to determine where the sending system is to add padding/dummy data to the supplemental data extracted from the original media file. According to this representative table, which is established during initial start-up/initialization and a copy of such table is used by both the sending system and the receiving system, there is a plurality of bandwidth entries 902 in the left-side column, and a plurality of associated sampling bit values 904 in the right-side. A bandwidth of 200 MHz would result in the sending side sending every 2nd bit of the original data stream and pad the other bits with dummy data. A bandwidth of 400 MHz would result in the sending side sending every $4^{th}$ bit of the original data steam as the supplemental data, with the remaining 3 bits being padded with dummy data. Likewise, a bandwidth of 600 MHz would result in the sending side sending every $6^{th}$ bit of the original data stream as the supplemental data, with the remaining 5 bits being padded with dummy data.

This mapping table also has specialized bandwidth values that are used to signal to the receiver when padding/dummy data is being transmitted by the sender. Multiple values are used to further enhance security aspects of the data transmission in that multiple different specialized bandwidth settings can be utilized to thwart attempts to monitor the network in an attempt to ease-drop/capture the data being transmitted. For example, in this particular example, three different specialized bandwidth values are used for such padding/dummy data transmission signaling—28.96 KHz, 40.08 KHz and 66.28 Khz—as further depicted in use in the comments of FIG. 13.

This padding of supplemental data by the sending data processing system is shown at 1000 of FIG. 10. Processing begins at step 1001, and proceeds to step 1002 where the bandwidth is ascertained (which is a mutually agreed upon parameter between the sending system and receiving system, as previously described). The supplemental data that needs to be sent to the receiving side is extracted from the original media file at step 1004. Since the sending system initially determined what data to send in the initial, degraded file per step 306 of FIG. 3, it has the information needed to determine what needs to be included in this supplemental file (which optionally was already established by the sending system during such step 306 of FIG. 3). The location to insert padding/dummy data based on the bandwidth is determined at step 1006, and the supplemental data file is padded at step 1008. This padded, supplemental file is then sent at step 1010, with the process ending at step 1012.

Figure 11:
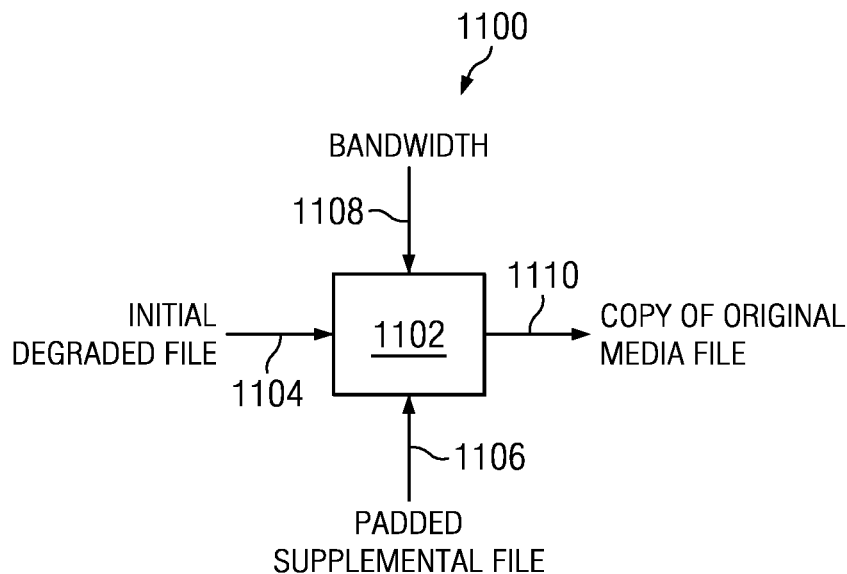
FIG. 11 depicts a sub-system for mixing/combining two data streams by a receiving system.

The remote software program at the recipient side combines/mixes the required supplemental data with the initial, degraded file that was previously received based on this same previously agreed network bandwidth rates. Turning now to FIG. 11, the receiving side sub-system for performing such combining/mixing is shown at 1100. A mixing/combining component 1102 mixes/combines the initial degraded file 1104 and the padded supplemental file 1106 based on the bandwidth 1108, in order to produce a copy of the original media file 1110.

Figure 12:
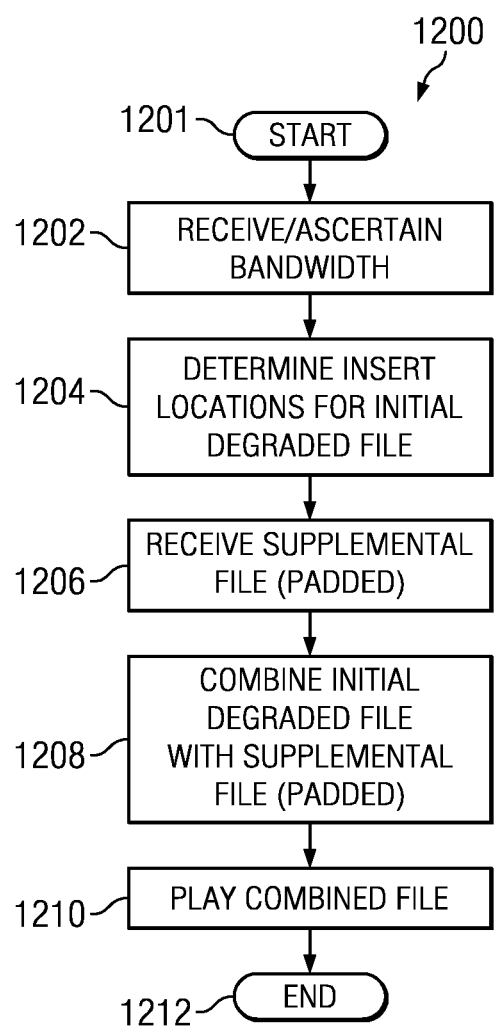
FIG. 12 depicts a mixing/combining of two data streams by a receiving system.

The mixing/combining process performed by the receiving data processing system is shown at 1200 in FIG. 12. The process starts at step 1201, and proceeds to step 1202 where the bandwidth established between the sending system and the receiving system is either received or ascertained. Using this bandwidth information, the locations within the initial, degraded file of where the supplemental data is to be placed is determined at step 1204. For example, if the bandwidth value is 400 MHz, every $4^{th}$ bit of the padded supplemental file 1106 of FIG. 11 contains good data to be added/mixed to the previously received initial degraded file 1104 of FIG. 11. The padded supplemental file is received at step 1206, where it is combined/mixed with the initial degraded file at step 1208. Since the padding/dummy data in both the initial degraded version and the supplemental file also serves as markers for where missing data exists in each respective file, these markers allow for synchronizing the combining/mixing of the two files together. This combined file 1110 of FIG. 11, which is a copy of the original media file, can then be played using speakers/video monitor such that it can be heard/seen by the recipients at the receiving side data processing system without being stored to a persistent storage device at step 1210, with the process ending at step 1212.

As an additional security measure, the sending data processing system may include, in a header of either the initial, degraded version of the media file or the supplemental version of the media data, a session identifier of a communication session established between the sending data processing system and the receiving data processing system. In this scenario, the mixing/combining process described with respect to FIG. 11 and FIG. 12 is selectively enabled in response to it being determined by the receiving data processing system that the session identifier included in such a received header matches the communication session ID for the communication session that the receiver data processing system has established with the sender data processing system.

Referring to FIG. 13, a representative example will now be given to show the above described media download operation in action. In this example, in order to more easily understand the logical flow as opposed to formatting details of a multimedia file, letters of the alphabet will be used to show how the initial, degraded version and supplemental version of the media file are manipulated. As previously mentioned, the sender knows before sending data the approximate bandwidth available between the sender and receiver, since the sender and receiver determine and agree upon a particular bandwidth for a particular point in time using a side-channel of the communication link between the sender and receiver. In this example, it is assumed that the available bandwidth is between 1 Kbyte and 100 Kbyte. This bandwidth is used to determine how much data is to be included in the initial, degraded version of the media data and how much data (i.e., the remaining portion of the media data) is to be included in the supplemental file. As further described below, a relatively high bandwidth allows more 'good' data to be sent in the supplemental file (and thus less 'good' data is sent in the initial, degraded file), whereas a relatively low bandwidth allows less 'good' data to be sent in the supplemental file (and thus more 'good' data is sent in the initial, degraded version which is not subject to critical time constraints since it is sent before being needed, such as before a scheduled teleconference meeting, and thus can contain more data due to such 'looser' time constraints).

In this example, the original media file is represented by an alphabetic character string of 'abcdefghijklmnopqrstuvwxyz', where one letter is to be 'played' at each corresponding time interval. Before sending the data, the sender and receiver determine a mutually agreed upon available bandwidth for the communication channel being used by the sender and receiver. For a relatively high bandwidth, it is desirable to send more 'good' data in the supplemental file so that the initial, degraded version is degraded more substantially than if less 'good' data were sent in the supplemental file (meaning more 'good' data would have to be sent in the initial, degraded version if less 'good' data were sent in the supplemental file). In this example, it is assumed that a relatively good bandwidth exists, so the supplemental file is prepared having more good data than the initial, degraded file. As depicted in FIG. 13, the degraded file is thus generated to be "abc**hijk*qrs*yz" and the supplemental file is thus generated to be "*defg**lmnop*tuvwx**".

As previously described, the initial, degraded version is initially sent by the sender to the receiver. Since this initial, degraded file is initially sent before the sender/receiver interplay with sending/receiving the supplemental file, this initial, supplemental file has the flexibility of containing more or less good data depending upon the available bandwidth, since if the bandwidth is low and thereby more data is being sent in the initial, degraded file (for reasons as previously described), the only consequence is that it will take longer to send this relatively large initial, degraded file due to the low bandwidth constraints.

After being received, the receiver begins to play back this initial, degraded file. For example, at time time1 the letter "a" is played. This letter "a" is also transmitted by the receiver to the sender such that the sender knows at time time2 that the receiver is starting to play the initial, degraded file. At time time3 the letter "b" is played. This letter "b" is also transmitted by the receiver to the sender such that the sender knows at time time4 where in the initial, degraded file the receiver is at in playing such file. At time times the letter "c" is played. This letter "c" is also transmitted by the receiver to the sender such that the sender knows at time time6 where in the initial, degraded file the receiver is at in playing such file.

When the sender recognizes "c" at time time6 (that was sent by the receiver to the sender when playing "c" by the receiver), the sender knows it needs to send the information in the supplemental file ("*defglmnop*tuvwx**"). Because the sender knows the approximate bandwidth of the communication channel, it is able to ensure that the supplemental file is sent and subsequently received in time at the receiver in order to be played at the correct time. However, due to network latencies associated with the network, and the fact that the sender waits to confirm that "c" has been successfully played at the receiver before beginning to send the 'good' data in the supplemental file, the first good data that is sent in the supplemental file—in this particular example, the letter "d"—will possibly be received at the receiver somewhat delayed from when it ideally should be played. For example, the letter "d" would ideally be played at time time7, but due to network latencies the sender does not send the "d" until time time7 since it does not confirm successfully playing of "c" until time time6. Thus, the very first part of the good data in the supplemental file that is received and then played at the receiver may be slightly delayed when it gets played at the receiver—in this case the letter "d" is played at time time9 instead of the ideal time time7. Once this initial receiver playing confirmation is made at the sender, however, subsequent supplemental data is transmitted before it needs to be played at the receiver, and thus the subsequent supplemental data does not experience this network latency delay caused by the initial playback confirmation that occurs during the initial startup of sending the supplemental data/file. It may thus be useful to send a short introductory portion in the degraded file where a replicated high fidelity playback is not critical.

Continuing with FIG. 13, at time time7, after having confirmed the successful playing of "abc" at the receiver, due to the transmit or echo-back of "abc" by the receiver to the sender at times time1, time3 and time5, respectively, the sender then begins sending the supplemental file, beginning in this example with the sending of the letter "d", where it is played by the receiver at time time9. Also at time time9, the sender sends "e", which is subsequently received by the receiver, and played at time time11. Also at time time11, the sender sends "f", which is subsequently received by the receiver, and played at time time13. Also at time time13, the sender sends "g", which is subsequently received by the receiver, and played at time time15. At time time17, the receiver plays "h", which was a part of the initial, degraded file that was initially sent and stored at the receiver. The receiver then plays "i", "j" and "k" at times time19, time21 and time23, respectively, as these were also a part of the initial, degraded file that was initially sent and stored at the receiver. In this example, the letter "l"—which is the next 'good' data in the supplemental file—is then transmitted to the receiver at time time23, and played at the receiver at time time25. It should be noted that this next good data in the supplemental file could have been transmitted earlier than time time25 since it is buffered at the receiver and mixed/synced into the initial degraded file using the padding/dummy data that act as markers for where to insert the supplemental data. It is not desirable to transmit 'l' later than time time25, however, as the same network latency issues would cause the data to arrive at the receiver later than when needed in similar fashion to the initial start-up portion of the supplemental data, as previously described. The remainder of the supplemental file is sent, and subsequently received and played by the receiver, in the same fashion as described above, as shown by the remainder of FIG. 13.

It should be noted that the concurrent transmitting and receiving at time time9, time1 1, time13, etc. is not a requirement, but is merely shown as an example. In an alternative embodiment, "e" could be transmitted at time time8 in lieu of sending the bandwidth-filling dummy character(s) "*", followed by sending "f" at time time9, etc. such that the entire supplemental file is sent without intervening bandwidth-filling dummy character(s) being sent. In this embodiment, the bandwidth-filling dummy characters would not be sent until after the entire supplemental file has been sent in its entirety.

In yet another embodiment, individual clusters such as "defg" could be sent back-to-back, followed by sending the bandwidth-filling dummy characters until the next individual cluster of "lmnop" is sent to the receiver, while ensuring that this second cluster is sent in time—taking into consideration the current bandwidth between the sender and receiver—such that it is received at the receiver before being needed to be played after the receiver plays the "k" portion of the initial, degraded file. This flexibility in timing with respect to sending the supplemental data/file is advantageously provided by the use of the exchanged/agreed upon bandwidth in conjunction with the bandwidth mapping table as depicted in FIG. 9, which allows for dynamic signaling by the sender of when the data is good data, or alternatively when the data is padding/dummy data used to maintain the overall file structure when just a portion of such file contains good data.

Thus, there has been described a method, apparatus and program product for distributing media content/data, where an initial, degraded version of the media data is sent to a recipient. After confirming an identity or otherwise authenticating one or more recipients, a supplemental version of the media data is sent to the recipient that augments the initial, degraded version. The degraded and supplemental version are merged together, and played at the receiving side of a teleconferenced meeting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A computer program product comprising a computer usable storage media have stored thereon program instructions for distributing media data, wherein the program instructions comprise program code for performing the steps of claim 1 when executed by the data processing system.

What is claimed is:

1. A method for playing a media file by a data processing system, comprising steps implemented by the data processing system of:
   receiving a degraded initial version of the media file from a sending data processing system;
   sending at least a portion of the degraded initial version of the media file to the sending data processing system to confirm successful receipt of the degraded initial version of the media file at the data processing system;
   receiving a supplemental version of the media file from the sending data processing system as a result of the sending data processing system having confirmed an identity of a recipient of the degraded initial version of the media file at the data processing system;
   merging the degraded version of the media file received from the sending data processing system with the supplemental version of the media file received from the sending data processing system to form a combined media file; and
   playing the combined media file by the data processing system.

2. The method of claim 1, wherein the degraded version of the media file received from the sending data processing system and the supplemental version of the media file received from the sending data processing system are merged by the data processing system based on a network bandwidth established between the sending data processing system and the data processing system at a particular moment in time.

3. The method of claim 1, wherein the degraded version of the media file received from the sending data processing system comprises dummy data interspersed within the degraded version of the media file.

4. The method of claim 3, wherein the merging step comprises the data processing system placing data from the supplemental version of the media file at locations where the dummy data is interspersed within the degraded version of the media file.

5. The method of claim 2, wherein the supplemental version of the media file comprises dummy data interspersed within the supplemental version of the media file.

6. The method of claim 1 further comprising a step of preventing the combined media file from being stored in a persistent storage of the data processing system.

7. The method of claim 1, wherein data in the combined media file is multimedia data comprising video and audio data.

8. The method of claim 1, wherein the multimedia data is encrypted.

9. The method of claim 1, wherein the degraded version of the media file received from the sending data processing system and the supplemental version of the media file received from the sending data processing system are merged by the data processing system responsive to an identifier included with at least one of the initial version of the media file and the supplemental version of the media file matching a session identifier of a communication session between the sending data processing system and the data processing system.

10. A data processing system for playing a media file, the data processing system comprising:
a central processing unit (CPU), a computer readable memory, and a computer readable storage media;
first program instructions to receive a degraded initial version of the media file from a sending data processing system;
second program instructions to send at least a portion of the degraded initial version of the media file to the sending data processing system to confirm successful receipt of the degraded initial version of the media file at the data processing system;
third program instructions to receive a supplemental version of the media file from the sending data processing system as a result of the sending data processing system having confirmed an identity of a recipient of the degraded initial version of the media file at the data processing system;
fourth program instructions to combine the degraded version of the media file received from the sending data processing system with the supplemental version of the media file received from the sending data processing system to form the media file; and
fifth program instructions to play the media file by the data processing system.

11. The data processing system of claim 10, wherein the degraded version of the media file received from the sending data processing system and the supplemental version of the media file received from the sending data processing system are merged by the data processing system based on a network bandwidth established between the sending data processing system and the data processing system at a particular moment in time.

12. The data processing system of claim 10, wherein the degraded version of the media file received from the sending data processing system comprises dummy data interspersed within the degraded version of the media file.

13. The data processing system of claim 12, wherein the merging step comprises the data processing system placing data from the supplemental version of the media file at locations where the dummy data is interspersed within the degraded version of the media file.

14. The data processing system of claim 11, wherein the supplemental version of the media file comprises dummy data interspersed within the supplemental version of the media file.

15. The data processing system of claim 10 further comprising a step of preventing the combined media file from being stored in a persistent storage of the data processing system.

16. The data processing system of claim 10, wherein data in the combined media file is multimedia data comprising video and audio data.

17. The data processing system of claim 10, wherein the degraded version of the media file received from the sending data processing system and the supplemental version of the media file received from the sending data processing system are merged by the data processing system responsive to an identifier included with at least one of the initial version of the media file and the supplemental version of the media file matching a session identifier of a communication session between the sending data processing system and the data processing system.

18. A computer program product comprising a non-transitory computer readable storage media have stored thereon program instructions for distributing media data, wherein the program instructions comprise program code for performing the steps of claim 1 when executed by the data processing system.

19. The method of claim 1, further comprising a step of:
forming the degraded initial version of the media file from a high quality version of the media file, wherein the combined file formed by merging the degraded version of the media file received from the sending data processing system with the supplemental version of the media file received from the sending data processing system corresponds to the high quality version of the media file.

20. The method of claim 19, wherein the degraded initial version of the media file received from the sending data processing system is formed by removing portions of data from the high quality version of the media file and filling in the removed portions with dummy data to form the degraded initial version of the media file.

21. The system of claim 10, further comprising fifth instructions for forming the degraded initial version of the media file from a high quality version of the media file, wherein the combined file formed by merging the degraded version of the media file received from the sending data processing system with the supplemental version of the media file received from the sending data processing system corresponds to the high quality version of the media file.

22. The system of claim 1, wherein the supplemental version of the media file received from the sending data processing system includes data extracted from the media file by the sending data processing system.

23. The system of claim 10, wherein the supplemental version of the media file received from the sending data processing system includes data extracted from the media file by the sending data processing system.

24. The computer program product of claim 18, wherein the supplemental version of the media file received from the sending data processing system includes data extracted from the media file by the sending data processing system.

* * * * *